United States Patent [19]

Meamber

[11] Patent Number: 4,681,027
[45] Date of Patent: Jul. 21, 1987

[54] RAPID COOKING APPARATUS FOR EGG FRYING UTENSIL

[76] Inventor: Jon F. Meamber, P.O. Box 885, Yreka, Calif. 96097

[21] Appl. No.: 155,917

[22] Filed: Jun. 3, 1980

Related U.S. Application Data

[63] Continuation of Ser. No. 899,611, Apr. 24, 1978, abandoned.

[51] Int. Cl.⁴ .............................................. A47J 29/00
[52] U.S. Cl. ........................................ 99/422; 99/426
[58] Field of Search ................. 99/422, 349, 357, 423, 99/424, 426, 427, 440; 220/355, 356; 126/246

[56] References Cited

U.S. PATENT DOCUMENTS

| | | | |
|---|---|---|---|
| 148,817 | 3/1874 | Fowler | 99/423 |
| 785,880 | 3/1905 | Hill | 99/422 UX |
| 936,343 | 10/1909 | Musser | 99/426 |
| 1,246,622 | 11/1917 | Lightfoot | 99/422 X |
| 1,281,943 | 10/1918 | Gonsalves | 99/422 X |
| 1,616,435 | 2/1927 | Allison | 99/422 |
| 1,900,761 | 3/1933 | Proteau | 99/440 UX |
| 1,906,999 | 5/1933 | Parker | 99/425 |
| 1,925,700 | 9/1933 | Matter | 99/422 X |
| 1,957,133 | 5/1934 | Davis | 99/424 |
| 1,989,287 | 1/1935 | Parr | 99/349 |
| 1,998,944 | 4/1935 | Spake | 99/425 |
| 2,241,317 | 5/1941 | Pringle | 99/349 |
| 2,462,728 | 2/1949 | Debs | 126/390 |
| 2,824,510 | 2/1958 | Gangwer | 99/440 X |
| 3,223,025 | 12/1965 | Johns | 99/424 X |
| 3,280,724 | 10/1966 | Kavanagh | 99/424 |
| 3,536,000 | 10/1970 | Whitehill | 99/425 |
| 3,777,653 | 12/1973 | Carruth | 99/422 |

FOREIGN PATENT DOCUMENTS 74303  11/1948  Norway ................ 99/422

*Primary Examiner*—Harvey C. Hornsby
*Assistant Examiner*—Frankie L. Stinson
*Attorney, Agent, or Firm*—Townsend and Townsend

[57] ABSTRACT

A rapid cooking apparatus for use with an egg frying utensil, the utensil including a handle and a plurality of egg confining tubes, is provided which substantially decreases the time in which eggs are cooked upon a griddle. The apparatus comprises a plate for superimposed seating upon the utensil tubes and serves for radiating heat downwardly, an aligning structure carried by the plate for cooperatively associating the plate with the utensil handle, and a lifting structure for guiding the plate member into and out of cooperative association with the utensil handle.

A method for decreasing the cooking time of a plurality of eggs upon a griddle, the cooking being substantially without browning, is also disclosed.

7 Claims, 4 Drawing Figures

RAPID COOKING APPARATUS FOR EGG FRYING UTENSIL

This is a continuation of application Ser. No. 899,611, filed 4-24-78 and now abandon.

BACKGROUND OF THE INVENTION

1. Field of the Invention

This invention relates to an apparatus for cooking eggs, and more particularly to a rapid cooking apparatus for combination with an egg frying utensil and to a method of cooking therewith.

2. Prior Art

In general, cooking processes may be characterized by the terms poaching, boiling, steaming, frying, broiling and baking. Poaching is herein defined as cooking the foodstuff in water or other liquid near the liquid's boiling point; boiling is a type of poaching wherein the foodstuff is cooked at the liquid's boiling point; steaming as cooking the foodstuff with or exposed to the action of steam; frying as cooking the foodstuff in a pan or griddle over direct heat, sometimes including hot fat; broiling as cooking the foodstuff by exposure to direct flame or intense heat; and baking as cooking the foodstuff by dry heat.

Eggs are normally cooked by being poached, boiled (in their shells), steamed or fried. Since eggs are easily scorched by the application of too much heat, and scorched eggs result in a generally disliked taste and appearance, broiling is usually considered an unacceptable process of egg cooking due to the high heat; whereas, although rapid, frying may be carefully controlled to prevent over browning. Poaching, boiling or steaming eggs provides a visually attractive cooked egg, with a slightly different flavor than fried egg, but the poaching and boiling processes are not readily adaptable to large scale operations, and the steaming process tends to yield a somewhat rubbery texture. Baking eggs has usually been reserved for home prepared, specialty egg dishes requiring moisture during the cooking process.

The rise of the fast-food industry in recent years has created food preparations and cooking needs which differ not only from home food preparation and cooking, but also differ from many of the previous restaurant and institutional cooking apparatus and methods therewith.

For example, the fast-food industry requires that many of its cooked foods not be separated for serving from one large, cooked batch, but rather that many of such foods have each been, as an individual serving, separately and rapidly cooked, assembled with condiments or additional foods, packaged and, if necessary, kept warm until sold. That is, among the most important considerations in the fast-food industry are individualization of servings, rapid cooking of the individual servings, and close consistency in taste appearance and degree of doneness between the servings.

When a large number of discrete eggs are to be cooked, such as in restaurant operations, frying upon a griddle is the preferred cooking process due to the rigid cooking of the egg, and the adaptability to large scale cooking operations. Further, the desire that cooked eggs be consistent in the degree of cooking, and in appearance, which is particularly true in a fast-food industry, mitigates against the practice of turning the eggs during cooking since egg yolks frequently break during turning; yet without turning, eggs take a longer period of time to fry.

Prior to the rapid cooking apparatus and method of the present invention, consistently and thoroughly cooked eggs (having an egg yolk which does not substantially run when the yolk membrane is pierced) by the process of frying the eggs upon a griddle have been obtained by use of a cooking utensil known to the art which includes a handle and a plurality of egg confining tubes. The tubes rest upon a heated griddle and provide consistently shaped and substantially thoroughly cooked eggs, although the thorough cooking generally requires a cooking time of about four minutes. The rate of cooking eggs within such a utensil may be somewhat decreased by raising the griddle temperature; however, the achievable rate decrease is not great and is further limited by the fact that too high a griddle temperature will result in overly browned cooked eggs and even in extreme cases scorched eggs as well as possible sticking of the eggs to the griddle.

A variety of frying utensils which disclose thoroughly cooking eggs without the necessity of turning the eggs during the cooking process and thus decrease the time of cooking are known to the art; among these are the teaching of U.S. Pat. No. 3,596,590 and the teaching of U.S. Pat. No. 608,144.

U.S. Pat. No. 3,596,590 discloses an apparatus which permits the passage of liquid into the vicinity of an egg which is cooking upon a skillet or grill whereby the liquid contacts the skillet or grill, turns into steam, and the egg upper surface is thus cooked by the steam (steamed) while the lower surface is cooked by frying. This steaming apparatus is awkward where a larger quantity of eggs are to be cooked and is thus not really adaptable to high volume fast food operation.

U.S. Pat. No. 608,144 discloses an apparatus wherein an egg is cooked by frying the egg bottom in a skillet and by frying the egg top through means of hot, liquid fat overflowed thereupon. The apparatus includes a cover for preventing fat spattering during the frying process. This frying apparatus is not suitable where a relatively non-greasy, non-browned cooked egg is desirable and is also not really adaptable to high volume fast-food operation.

SUMMARY OF THE INVENTION

It is accordingly an object of the present invention to provide a rapid cooking apparatus for use with an egg frying utensil which includes a handle and a plurality of egg confining tubes, which apparatus decreases the time necessary to thoroughly cook eggs therein, and which provides attractive eggs consistent in taste, degree of cooking and appearance one to the others.

It is another object of the present invention to provide an apparatus and method of cooking therewith which reduces energy used in cooking.

It is a further object of the present invention to provide a method for decreasing the cooking time of a plurality of eggs cooked on a griddle, wherein the eggs are cooked substantially without browning.

The present invention provides a rapid cooking apparatus for use with an egg frying utensil, the utensil including a handle and a plurality of egg confining tubes for resting upon a griddle. The inventive apparatus comprises a plate, heat radiating means alignment means and lifting means. The plate has a thermally conductive lower surface which is adapted for superimposed seating on the tubes. The heat radiating means is carried by the plate lower surface and is for radiating heat downwardly to speed up cooking of tube confined eggs. The aligning means is carried by the plate and is cooperatively associatable with the handle for correctly seating the plate on the tubes. The lifting means is attached to the plate and guides the plate into and out of cooperative association with the handle.

The present invention also teaches a method of decreasing the cooking time of plurality of eggs cooked on a heated griddle comprising the steps of: heating a plate member on the griddle; confining eggs in the tube members; and, superimposing the heated plate member upon the tube members whereby the eggs are cooked through simultaneously frying on the griddle and baking by the plate member.

THE DRAWING

The present invention as well as additional objects accomplished thereby will be better understood by reference to the accompanying drawings and by examination of the following detailed description.

DETAILED DESCRIPTION OF THE PREFERRED EMBODIMENT

Figure 2:
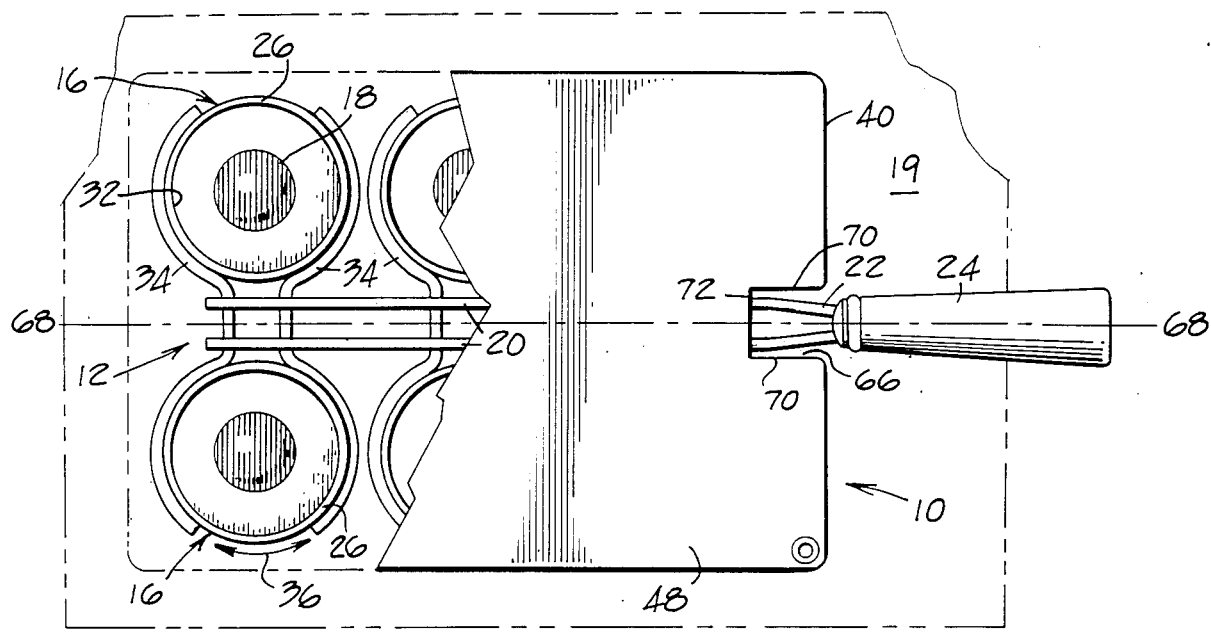
FIG. 2 is a top view, partially broken away, of the apparatus of the present invention as in FIG. 1.
Figure 1:
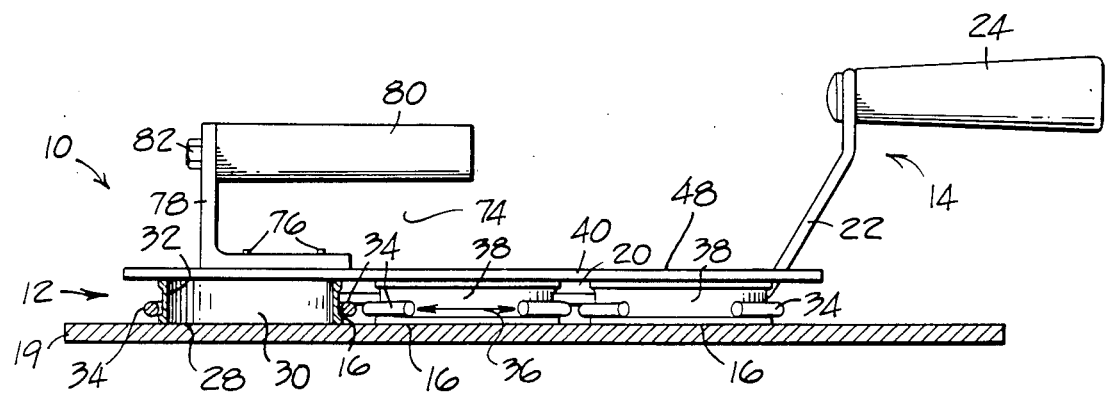
FIG. 1 is a side view of an apparatus in accordance with the present invention in superimposed relation with an egg frying utensil.

Referring to FIGS. 1 and 2, a rapid cooking apparatus 10 is designed for use with an egg frying utensil 12. The egg frying utensil 12 includes a handle 14 and a plurality of tubes 16 for confining shelled eggs 18 which rest upon a griddle 19.

Utenhsil 12 is known to the art, and is designed with an extended structural member 20 which terminates at one end with an upwardly rising portion 22 to which is affixed grip 24. Upwardly rising portion 22 and grip 24 together comprise handle 14. Griddle 19 may be any conventional griddle with a flat upper surface and which is heatable to at least 220° F.

Structural member 20 carries tubes 16 which laterally branch from both sides of member 20. Each tube 16 includes flat upper face 26, a flat lower face 28, a bore 30 extending entirely through each tube 16, and tube walls 32 surrounding bore 30. A typical branched configuration for tubes 16 is illustrated in FIGS. 1 and 2 wherein three pairs of tubes 16 are symmetrically arranged along the extended structural member 20. One conventional method by which member 20 carries tubes 16 is whereby sets of cross pieces 34 are affixed to member 20, the cross pieces 34 laterally extending from both sides of member 20 and adapted to conform exterior to and along a sufficient distance of walls 32 so as to carry tube 16, but with a gap 36 defined by cross pieces 34. The gap 36 permits tube 16 to be urged from cross pieces 34, removed for washing, and then replaced.

Tubes 16 are designed to rest upon their lower faces 28 so that the lower faces are flush with a griddle 19 surface (best illustrated in FIG. 1) and the upper faces 26 permit that an egg 18 may be received down through bore 30 (best illustrated in FIG. 2). One variation of frying utensil 12 is that the exterior of walls 32 include a grooved portion 38 of sufficient width so that tubes 16 may vertically ride within cross pieces 34 and hence each tube 16 may continue to make flush contact with the griddle surface even if cross pieces 34 become somewhat warped during use.

Tubes 16 are of a size so that when an egg 18 is deposited into a tube 16, the egg makes contact along the entire lower portion of the interior of wall 32 and is thus confined from further spreading on the griddle 19.

Finally, tubes 16 are normally formed of a material such as cast iron or steel, so that the tubes 16 and griddle together function as heat conducting materials for frying the egg through direct contact.

The frying utensil 12 and griddle 19 are normally brushed with a small amount of oil, such as butter or peanut oil, merely to prevent portions of the egg from adhering to the frying utensil 12 and griddle 19 after the frying process, or to impart desirable taste, rather than the oil being used as a heat transfer or browning material.

The rapid cooking apparatus 10 of the present invention for use with the above frying utensil 12 and griddle 19 must comprise four essential elements:

A plate, means for radiating heat, aligning means and lifting means.

A plate 40 includes an upper surface 48 and a lower surface 50. Lower surface 50 must be formed of a substantially thermally conductive material so that heat is evenly spread between tubes 16, further described below. Among thermally conductive materials suitable for use in the apparatus of the present invention are vitreous and ceramic materials, and metals with a thermal conductivity above about 2 W/cm° K such as copper and aluminum. The preferred mode for forming lower surface 50 of a thermally conductive material is that the entire plate 40 comprises the thermally conductive material. The preferred thermally conductive material is aluminum which is relatively light weight, compared to ceramic materials, which does not easily dent, chip or crack under institutional use, and yet which has a sufficiently high thermal conductivity.

Figure 3:
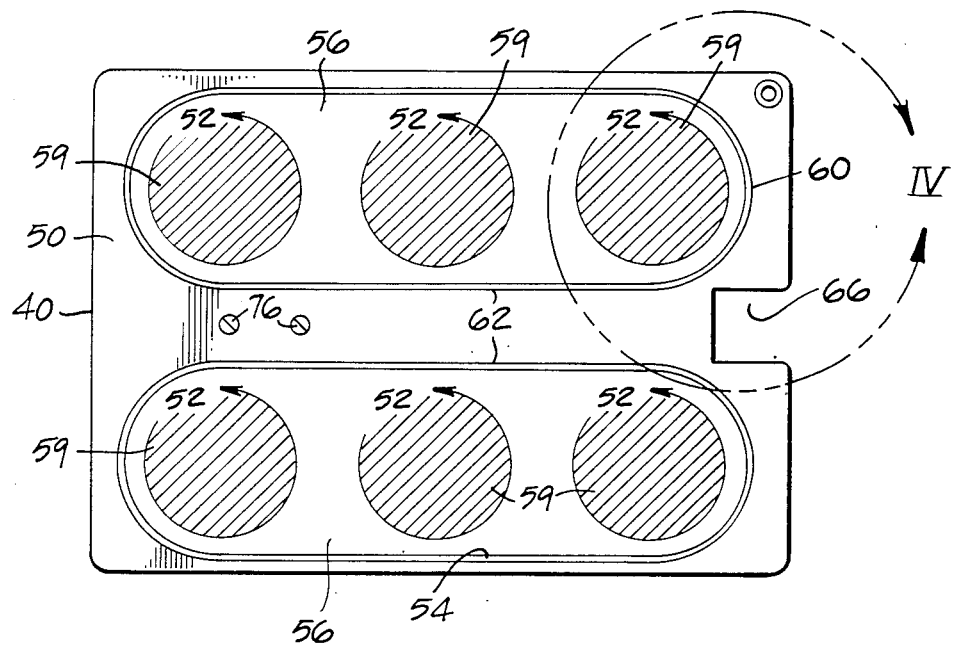
FIG. 3 is a plan bottom view of the apparatus of the present invention.

Turning to FIG. 3, lower surface 50 is adapted for seating in superimposed relation upon the upper faces 26 of tubes 16 as follows. The portion of lower surface 50, illustrated by arrows 52, on which lower surface 50 is adapted to seat must substantially conform to the upper faces 26 of the tubes 16. As previously noted, upper faces 26 are conventionally flat, therefore seating portion 52 is substantially flat.

It has been discovered that the best mode for apparatus 10 is not to provide an entirely flat lower surface 50 although such will work and is contemplated as falling within the scope of the invention, but rather a preferred embodiment for the invention is that lower surface 50 defines a set of grooves 54, wherein each groove 54 has a substantially flat bottom 56 for seating upon at least one tube 16.

As best illustrated by FIG. 3, seating portions 52 lie in the plane defined by groove bottom 56, and each groove bottom 56 is illustrated as seatable upon three upper faces 26 of tubes 16.

Figure 4:
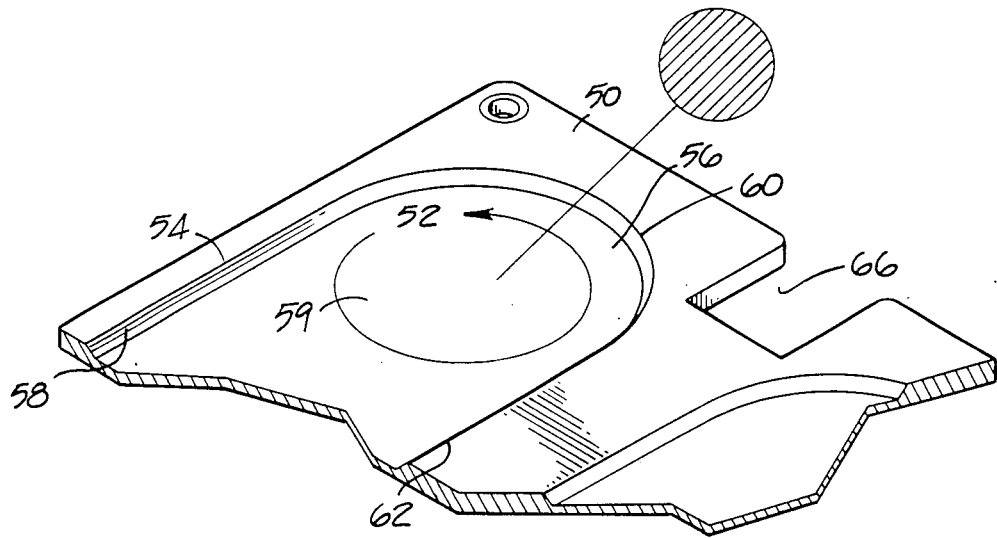
FIG. 4 is a detailed view taken along portion IV of FIG. 3, as part of the apparatus of the invention in perspective.

Referring to FIG. 4, each groove 54 has an edge 58 which is beveled inwardly with respect to the groove bottom 56. Beveled edge 58 may be of an inclined planar shape or of an arcuate shape; however, it is more preferred that beveled edge 58 is of an arcuate shape such as may be formed by conventional routing processes or the like. The thermally conductive material of which lower surface 50 is comprised will evenly spread heat conducted from the griddle, via each wall 28 and each seating portion 52, to the other tubes 16.

The inventive apparatus 10 must include heat radiating means 59 within the lower surface seating portion 52 (or in the case of a flat bottomed plate 40, the lower surface 50 thereof) for downwardly radiating heat during use to speed up cooking of the tube-confined eggs.

The heat radiating means 59 preferably comprises a metallic material, more preferably aluminum which has been preheated prior to use of apparatus 10 with frying utensil 12 and can simply comprise the lower surface 50 of the plate 40. It is most preferred that the aluminum be anodized to a relatively dark color, such as illustrated by shading for the color brow in FIGS. 3 and 4. It has also been found that a balance between the necessary thermal conductivity properties for lower surface 50 and the necessary heat radiation properties for heat radiating means 59 is most practically achieved when the entire plate 40 comprises anodized aluminum which is sufficiently heated prior to superimposing upon frying utensil 12. Sufficient heating is a temperature approaching or substantially equal to 220° F. It is believed that in providing the means for radiating heat downwardly within the seating portion 52, the apparatus 10 of the present invention functions to radiantly heat and thereby bake the tops of eggs 18 simultaneously with the egg sides and bottoms being fried by the utensil 12 and griddle 19.

The third element necessary in the inventive apparatus 10 is alignment means. Returning to FIG. 2, the alignment means comprises a detent 66, generally in the form of a notch, carried by plate 40. Detent 66 is symmetrical about a horizontal axis, illustrated by dotted line 68, wherein the horizontal axis 68 lies in a plane substantially perpendicular to upper surface 50, the plane passing through structural member 20, portion 22, and grip 24.

During use of the apparatus 10 with frying utensil 12, detent 66 is cooperatively associable with handle 14 as follows: detent 66 partially surrounds upward rising portion 22 so that plate 40 is aligned transversely with respect to horizontal axis 68 by detent walls 70 and rising portion 22, and is longitudinally aligned along horizontal axis 68 by detent end 72 and rising portion 22, wherein detent end 72 is stopped by rising portion 22. The alignment means can also preferably comprise arcuate ends 60 and substantially linearly extending sides 62 of grooves 54. Arcuate ends 60 and detent end 72 cooperate to permit some play along groove bottom 56 during the seating of plate 40 with respect to longitudinal alignment so that stopping of detent end 72 by rising portion 22 need not result in continued contact of one with the other. However, the linearly extending sides 62 and detent walls 70 substantially limit transverse movement and hence non-alignment of apparatus 10. This small amount of longitudinal play, which is permitted while transverse movement is restricted, provides correct alignment, and is particularly desirable when the inventive apparatus 10 is being utilized in large-scale, fast food industries where operator motions must be rapid but the eggs must be consistent in degree of cookedness.

Finally, the rapid cooking apparatus 10 must include lifting means for guiding the plate 40 into and out of cooperative association with handle 14. Referring to FIG. 1, lifting means 74 is attached to plate 40 as by conventional attachment means such as screws 76 which preferably are slightly counter-sunk in lower surface 50, best illustrated in FIG. 3. Lifting means 74 preferably comprises attachment bar 78 which rises upwardly from upper surface 48 a sufficient distance so that an operator can grip a lifting member 80 without the hazard of accidently brushing upper surface 48 during use. Lifting member 80 is formed of a non-thermally conducting material such as wood or any of various hard, heat resistant plastics, and is attached to attachment bar 78 by conventional fastening means such as nut 82.

It is preferred that lifting member 80 is bilaterally oriented in a plane substantially perpendicular to lower surface 50, so that an operator, whether left or right handed, can easily grip handle 14 with one hand and simultaneously use the other hand for gripping lifting member 80.

METHOD

The method of decreasing the cooking time of a plurality of eggs cooked on a heated griddle, the eggs being cooked substantially without browning, comprises heating a plate member, such as plate 40, on the griddle until the plate member is at a temperature approaching or substantially equal to that of the griddle.

It has been found that without this important heating step, use of the plate member for subsequently superimposing upon the egg confining tube members results in little or no time decrease in cooking of the tube confined eggs. It is believed that without first separately heating the plate member, the plate member may not adequately function as means for downwardly radiating heat. Rather, the use of a cool plate member may merely function primarily as a confining member (lid) which acts to implement convection for the limited amount of heated air or small amounts of moisture which may be present in the eggs.

Heating of the plate member to a temperature of about 220° F. has bee found to permit thorough cooking of eggs, substantially without browning for consumer preference.

When the plate has been heated, eggs are deposited in each tube member wherein they are confined, the tube members resting upon the hot griddle.

The heated plate member is then superimposed upon the egg confining tube members a sufficient period of time to thoroughly cook the eggs substantially without browning. The time found to be sufficient for such cooking is from about 2 minutes to about 2 minutes and 40 seconds on a griddle at a temperature of about 220° F. By contrast, without the plate member being superimposed, it has been found the time for eggs to be thoroughly cooked is about 4 minutes on a griddle at a temperature of about 325° F., and the eggs are significantly browned; and without the plate member being first heated, but rather being superimposed when cool, the eggs are also cooked in about 4 minutes, although without substantial browning. Thus significant energy use reduction (through lower temperature - shorter time operation) results.

In summary, a rapid cooking apparatus for use with an egg frying utensil, the utensil including a handle and a plurality of egg confining tubes for resting upon a griddle, is provided which rapidly, thoroughly and substantially without browning cooks the tube-confined eggs.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known customary practice in the art to which the invention pertains and as may be applied to the essential features here set forth, and which fall within the scope of the invention and the limits of the appended claims.

What is claimed is:

1. In combination with a griddle and a portable egg frying utensil including a plurality of egg confining tubes for resting at an arbitrary location on said griddle, said tubes having upper surfaces that lie substantially in a common plane when said tubes rest on said griddle, and a first handle connected to said egg-confining tubes for carrying said utensil, said first handle extending upwardly beyond said common plane and having a predetermined width at a position in said common plane, the improvement comprising:

a bilaterally symmetric self-contained plate separable from said utensil, said plate having an upper surface and a thermally conductive lower surface, the lower surface having a first flat portion adapted to seat on said tubes to permit said plate to assume a first, superimposed position, and a second flat portion for contacting said griddle when said plate is removed from said utensil to permit said plate to assume a second, griddle-contacting position so that said griddle conductively heats said plate;

a second handle attached to said plate in a bilaterally symmetric manner and extending upwardly from said upper surface to permit a user to easily manipulate said plate between said first and said second positions;

said plate having portions defining a notch centrally located along an edge thereof, said notch having a dimension parallel to said edge that is slightly greater than said predetermined width, said notch being positioned along said edge to partially surround said first handle proximate said common plane when said first portion of said lower surface is seated along said tubes and to restrict motion of said plate in a direction parallel to said edge;

said notch and said first handle portion being structured and co-functioning to enable said user to quickly position said plate in said first position on said tubes upon grasping said second handle and removing said plate from said griddle; and said plate in said first position being formed to give off heat downwardly onto eggs positioned within said tubes to cook them partially from above and greatly reduce the cooking time thereof.

2. The invention of claim 1 wherein said griddle is at a temperature substantially less than 325° F.

3. The invention of claim 2 wherein said temperature is approximately 220° F.

4. A device for use with a portable egg-frying utensil including a plurality of egg-confining tubes for resting upon a griddle, the tubes having upper extremities that lie substantially in a common plane when said tubes rest on said griddle, and a first handle connected to said egg-confining tubes for carrying said utensil, said first handle extending upwardly beyond said common plane and having a predetermined width at a position in said common plane, said device comprising in combination:

a plate separable from said utensil, wherein a lower surface of said plate has a thermally conductive portion for rapid heating of said plate when said portion is in contact with said griddle and a thermally radiative portion adapted to rest in superimposed relation on said tubes for radiating heat from said plate downward onto eggs positioned within said tubes when said plate is in said superimposed relation;

a second handle formed of thermally non-conducting material and attached to said plate and extending upwardly therefrom; and said plate having portions defining a notch proximate an edge thereof, said notch being structured to cofunction with said first handle and with said predetermined width for guiding said plate toward said superimposed relation and for aligning said plate on said tubes.

5. The device of claim 4 wherein said plate has a darkened lower surface to increase the heat radiation capability thereof.

6. The device of claim 4 wherein said utensil is bilaterally symmetric about said first handle and wherein said plate is bilaterally symmetric with respect to said second handle and said notch to facilitate rapid placement and positioning of said plate on said tubes.

7. The device of claim 4 wherein said thermally radiative portion is disposed at a level above said thermally conductive portion and parallel thereto.

* * * * *